United States Patent
Prasad

(10) Patent No.: US 12,124,836 B2
(45) Date of Patent: Oct. 22, 2024

(54) SYSTEMS AND METHODS FOR EVALUATING, VALIDATING, AND IMPLEMENTING SYSTEM ENVIRONMENT PRODUCTION DEPLOYMENT TOOLS USING COGNITIVE LEARNING INPUT

(71) Applicant: BANK OF AMERICA CORPORATION, Charlotte, NC (US)

(72) Inventor: Khandavally Siva Ranga Prasad, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 98 days.

(21) Appl. No.: 17/979,988

(22) Filed: Nov. 3, 2022

(65) Prior Publication Data

US 2024/0152343 A1    May 9, 2024

(51) Int. Cl.
*G06F 8/65* (2018.01)
*G06F 8/71* (2018.01)

(52) U.S. Cl.
CPC . *G06F 8/65* (2013.01); *G06F 8/71* (2013.01)

(58) Field of Classification Search
CPC ..................................... G06F 8/65; G06F 8/71
See application file for complete search history.

(56) References Cited

U.S. PATENT DOCUMENTS

| | | | |
|---|---|---|---|
| 8,276,123 B1 | 9/2012 | Deng et al. | |
| 8,468,244 B2 | 6/2013 | Redlich et al. | |
| 8,560,366 B2 | 10/2013 | Mikurak | |
| 8,572,566 B2 * | 10/2013 | Gass | G06F 8/71 |
| | | | 717/121 |
| 9,286,612 B2 | 3/2016 | Frankland et al. | |
| 9,652,320 B2 | 5/2017 | Shah et al. | |
| 10,540,176 B2 * | 1/2020 | Jackson | G06F 8/77 |
| 10,579,367 B2 | 3/2020 | Lander et al. | |
| 10,606,576 B1 | 3/2020 | Chung et al. | |
| 10,733,087 B2 * | 8/2020 | Wiener | G06F 11/3466 |
| 10,740,469 B2 * | 8/2020 | Zheng | G06F 8/427 |
| 11,301,569 B2 * | 4/2022 | Wyatt | G06F 8/61 |
| 11,379,219 B2 | 7/2022 | Bhalla et al. | |
| 11,797,735 B1 * | 10/2023 | Gommershtadt | G06N 20/00 |
| 2019/0294528 A1 * | 9/2019 | Avisror | G06F 11/3688 |
| 2019/0303541 A1 * | 10/2019 | Reddy | G06F 21/64 |
| 2019/0303579 A1 * | 10/2019 | Reddy | H04L 9/3239 |
| 2019/0303623 A1 * | 10/2019 | Reddy | G06F 8/71 |
| 2019/0305957 A1 * | 10/2019 | Reddy | G06F 8/60 |
| 2019/0305959 A1 * | 10/2019 | Reddy | G06F 8/73 |

(Continued)

*Primary Examiner* — Daxin Wu
(74) *Attorney, Agent, or Firm* — Moore & Van Allen PLLC; Nicholas C. Russell

(57) ABSTRACT

Systems, computer program products, and methods are described herein for evaluating, validating, and implementing software release change requests to a system environment based on artificial intelligence input. The present invention may be configured to receive a software release change request including a change to be made to a configuration item of a system environment, determine, based on a change inference database, potential failure points associated with deploying the software release change request in the system environment, and determine, based on the potential failure points, a confidence score for the change using a cognitive release evaluation system module comprising an artificial intelligent or machine learning engine.

17 Claims, 5 Drawing Sheets

(56) References Cited

U.S. PATENT DOCUMENTS

| | | | | |
|---|---|---|---|---|
| 2019/0306173 A1* | 10/2019 | Reddy | ............... | H04L 63/0281 |
| 2019/0354709 A1* | 11/2019 | Brinskelle | ............... | G06F 21/31 |
| 2020/0034133 A1* | 1/2020 | Dattatri | ............... | G06F 8/65 |
| 2020/0250675 A1* | 8/2020 | Hanis | ............... | G06Q 20/4016 |
| 2022/0345457 A1* | 10/2022 | Jeffords | ............... | G06F 21/6218 |
| 2023/0106381 A1* | 4/2023 | Chauhan | ............... | G06F 11/3414 |
| | | | | 714/25 |

* cited by examiner

SYSTEMS AND METHODS FOR EVALUATING, VALIDATING, AND IMPLEMENTING SYSTEM ENVIRONMENT PRODUCTION DEPLOYMENT TOOLS USING COGNITIVE LEARNING INPUT

FIELD OF THE INVENTION

The present invention embraces systems and methods for evaluating, validating, and implementing software deployments in a system environment based on artificial intelligence input and may include conducting a pre-or-post-implementation analysis of acceptable thresholds via a cognitive release evaluation module and smart decision engine.

BACKGROUND

An electronic system may be configured to determine whether a user is authorized to make changes or implement new software to a system environment. In response to determining that the user is authorized, the electronic system may implement a release, provided by the user, including changes to be made to configuration items in a system environment.

SUMMARY

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, the present invention embraces a system for evaluating, validating, and implementing software release change requests to a system environment based on artificial intelligence input. The technical solution has effectively bridged the gaps by performing release assessment at multiple levels and multiple stages of release life cycle. Each phase is evaluated against the defined threshold limits then given signoff for the next stage. In conventional approaches, production deployment tools do not have a direct connection with release management tools, and there is ample manual intervention required which may be prone to human error. The present solution minimizes the manual intervention so that human errors are avoided. The system may include at least one non-transitory storage device and at least one processing device coupled to the at least one non-transitory storage device, where the at least one processing device may be configured to receive a software release change request including a change to be made to a configuration item of a system environment and determine, based on a change inference database, potential failure points associated with deploying the software release change request in the system environment, where the change inference database is generated based on historical software release change request data. The at least one processing device may be configured to determine, based on the potential failure points, a confidence score for the change and determine whether the confidence score for the change satisfies a threshold limit for the configuration item, where the threshold limit is a baseline value to approve changes to the configuration item. The at least one processing device may be configured to prevent the software release change request from being deployed in the system environment until the confidence score for the change satisfies the threshold limit for the configuration item, generate, based on determining that the confidence score for the change satisfies the threshold limit for the configuration item, an authentication token including instructions for deployment tools, and implement, using the deployment tools and based on the instructions, the software release change request in the system environment.

In some embodiments, the at least one processing device may be configured to generate, based on the historical software release change request data, the change inference database. Additionally, or alternatively, the at least one processing device may be configured to, when generating the change inference database, generate the change inference database using a first machine learning model, where the first machine learning model is trained based on the historical software release change request data. In some embodiments, the at least one processing device may be configured to, when generating the change inference database, analyze the historical software release change request data using natural language processing, and, when determining the potential failure points associated with deploying the software release change request in the system environment, analyze the software release change request using the natural language processing. Additionally, or alternatively, the at least one processing device may be configured to, after implementing the software release change request in the system environment, retrain the first machine learning model based on the historical software release change request data, the software release change request, and an outcome of implementing the software release change request in the system environment and update the change inference database using the first machine learning model.

In some embodiments, the at least one processing device may be configured to determine, based on the historical software release change request data, the threshold limit for each configuration item of the system environment. Additionally, or alternatively, the at least one processing device may be configured to, when determining the threshold limit for each configuration item of the system environment, determine the threshold limit for each configuration item of the system environment using a second machine learning model, where the second machine learning model is trained based on the historical software release change request data. In some embodiments, the at least one processing device may be configured to, after implementing the software release change request in the system environment, retrain the second machine learning model based on the historical software release change request data, the software release change request, and an outcome of implementing the software release change request in the system environment and update the threshold limit for each configuration item of the system environment using the second machine learning model.

In some embodiments, the at least one processing device may be configured to, when preventing the software release change request from being deployed in the system environment, generate, based on determining that the confidence score for the change satisfies the threshold limit for the configuration item, based on the change, and based on a change window for the software release change request, a secure token for the software release change request, where the secure token is only valid during the change window. Additionally, or alternatively, the at least one processing device may be configured to, when preventing the software release change request from being deployed in the system environment, determine whether the secure token is valid. In some embodiments, the at least one processing device may be configured to, when generating the authentication token, generate the authentication token based on determining that the secure token is valid, based on a deployment tool database, and based on the secure token.

In some embodiments, the software release change request may include multiple changes to be made to the configuration item and other changes to be made to other configuration items of the system environment, and the at least one processing device may be configured to, when determining the confidence score, determine, based on the potential failure points, confidence scores for the multiple changes and other confidence scores for the other changes and, when determining whether the confidence score for the change satisfies the threshold limit for the configuration item, determine whether the confidence scores for the multiple changes satisfy the threshold limit for the configuration item and determine whether the other confidence scores for the other changes satisfy other threshold limits for the other configuration items.

In some embodiments, the at least one processing device may be configured to determine, based on the historical software release change request data, classifications for historical software release change requests, where the classifications include configuration items of the system environment, and determine, based on the software release change request, the classifications impacted by the software release change request.

In some embodiments, the confidence score may be a probability of successful implementation of the software release change request in the system environment without negatively impacting other configuration items in the system environment.

In another aspect, the present invention embraces a computer program product for evaluating, validating, and implementing software release change requests to a system environment based on artificial intelligence input. The computer program product may include a non-transitory computer-readable medium including code causing a first apparatus to receive a software release change request including a change to be made to a configuration item of a system environment and determine, based on a change inference database, potential failure points associated with deploying the software release change request in the system environment, where the change inference database is generated based on historical software release change request data. The non-transitory computer-readable medium may include code causing the first apparatus to determine, based on the potential failure points, a confidence score for the change and determine whether the confidence score for the change satisfies a threshold limit for the configuration item, where the threshold limit is a baseline value to approve changes to the configuration item. The non-transitory computer-readable medium may include code causing the first apparatus to prevent the software release change request from being deployed in the system environment until the confidence score for the change satisfies the threshold limit for the configuration item, generate, based on determining that the confidence score for the change satisfies the threshold limit for the configuration item, an authentication token including instructions for deployment tools, and implement, using the deployment tools and based on the instructions, the software release change request in the system environment.

In some embodiments, the non-transitory computer-readable medium may include code causing the first apparatus to generate, based on the historical software release change request data, the change inference database. Additionally, or alternatively, the non-transitory computer-readable medium may include code causing the first apparatus to, when generating the change inference database, generate the change inference database using a first machine learning model, where the first machine learning model is trained based on the historical software release change request data. In some embodiments, the non-transitory computer-readable medium may include code causing the first apparatus to, when generating the change inference database, analyze the historical software release change request data using natural language processing, and when determining the potential failure points associated with deploying the software release change request in the system environment, analyze the software release change request using the natural language processing. Additionally, or alternatively, the non-transitory computer-readable medium may include code causing the first apparatus to, after implementing the software release change request in the system environment, retrain the first machine learning model based on the historical software release change request data, the software release change request, and an outcome of implementing the software release change request in the system environment and update the change inference database using the first machine learning model.

In yet another aspect, a method for evaluating, validating, and implementing software release change requests to a system environment based on artificial intelligence input is presented. The method may include receiving a software release change request including a change to be made to a configuration item of a system environment, determining, based on a change inference database, potential failure points associated with deploying the software release change request in the system environment, where the change inference database is generated based on historical software release change request data, and determining, based on the potential failure points, a confidence score for the change. The method may include determining whether the confidence score for the change satisfies a threshold limit for the configuration item, where the threshold limit is a baseline value to approve changes to the configuration item and preventing the software release change request from being deployed in the system environment until the confidence score for the change satisfies the threshold limit for the configuration item. The method may include generating, based on determining that the confidence score for the change satisfies the threshold limit for the configuration item, an authentication token including instructions for deployment tools and implementing, using the deployment tools, and based on the instructions, the software release change request in the system environment.

The features, functions, and advantages that have been discussed may be achieved independently in various embodiments of the present invention or may be combined with yet other embodiments, further details of which may be seen with reference to the following description and drawings.

BRIEF DESCRIPTION OF THE DRAWINGS

Figure 1:
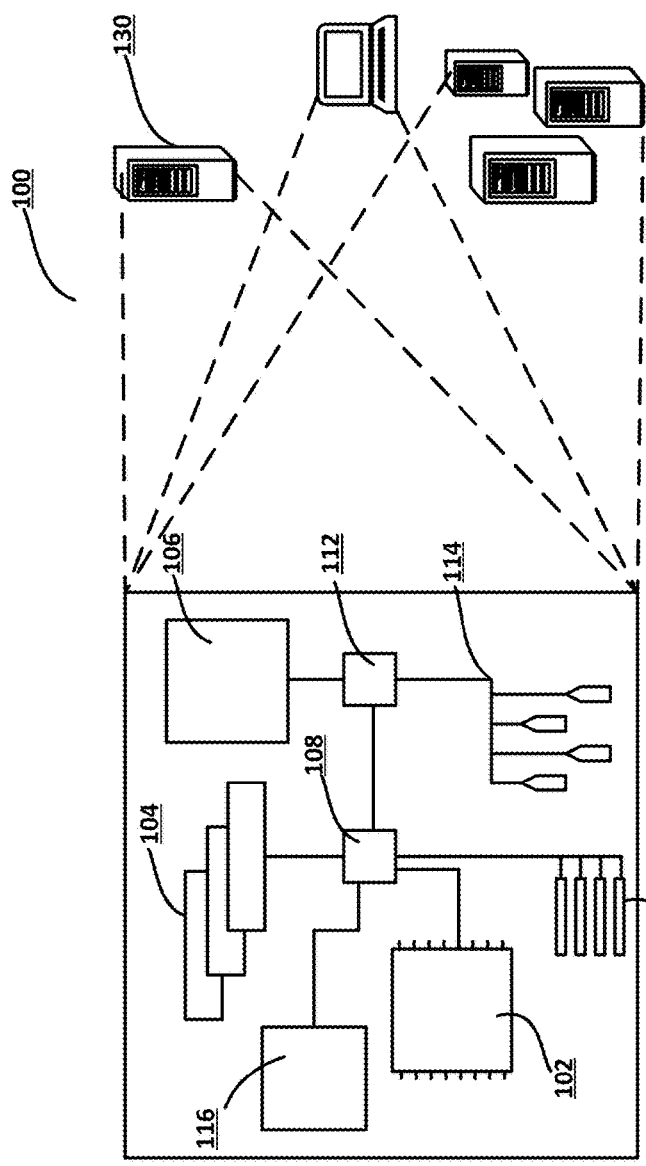
Figure 1:
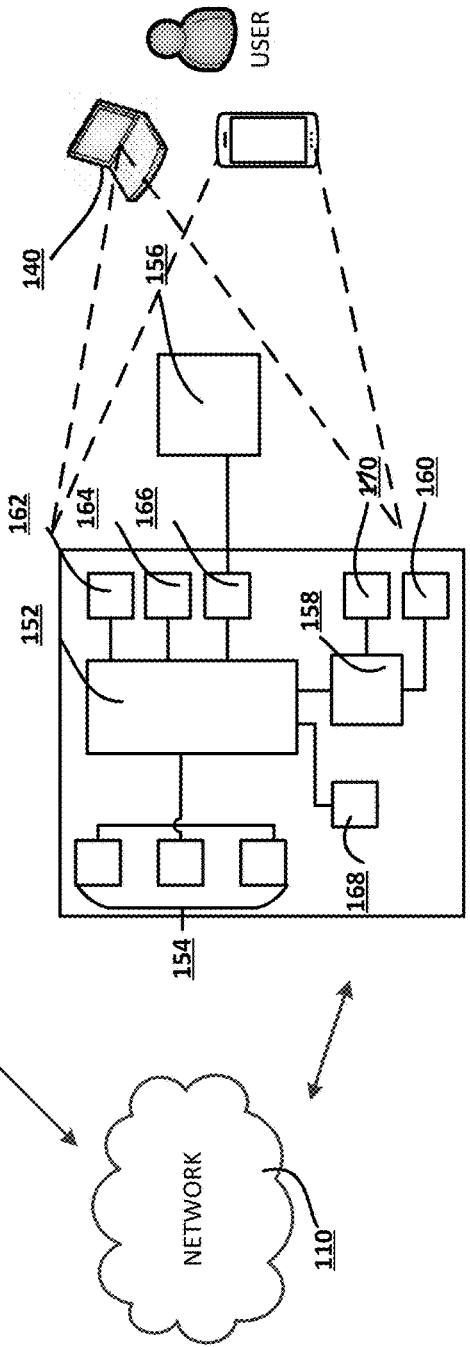
Figure 2:
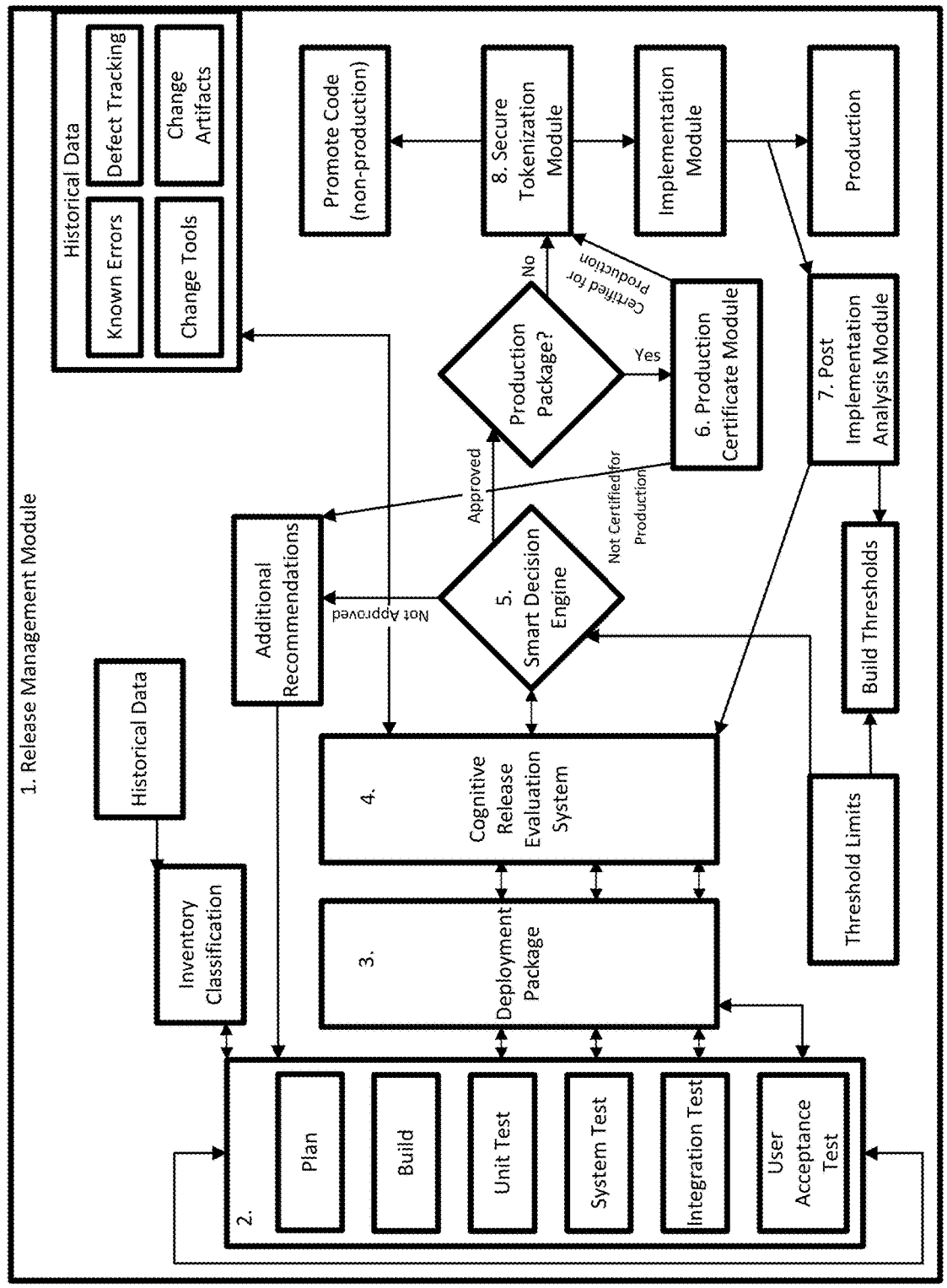
Figure 3:
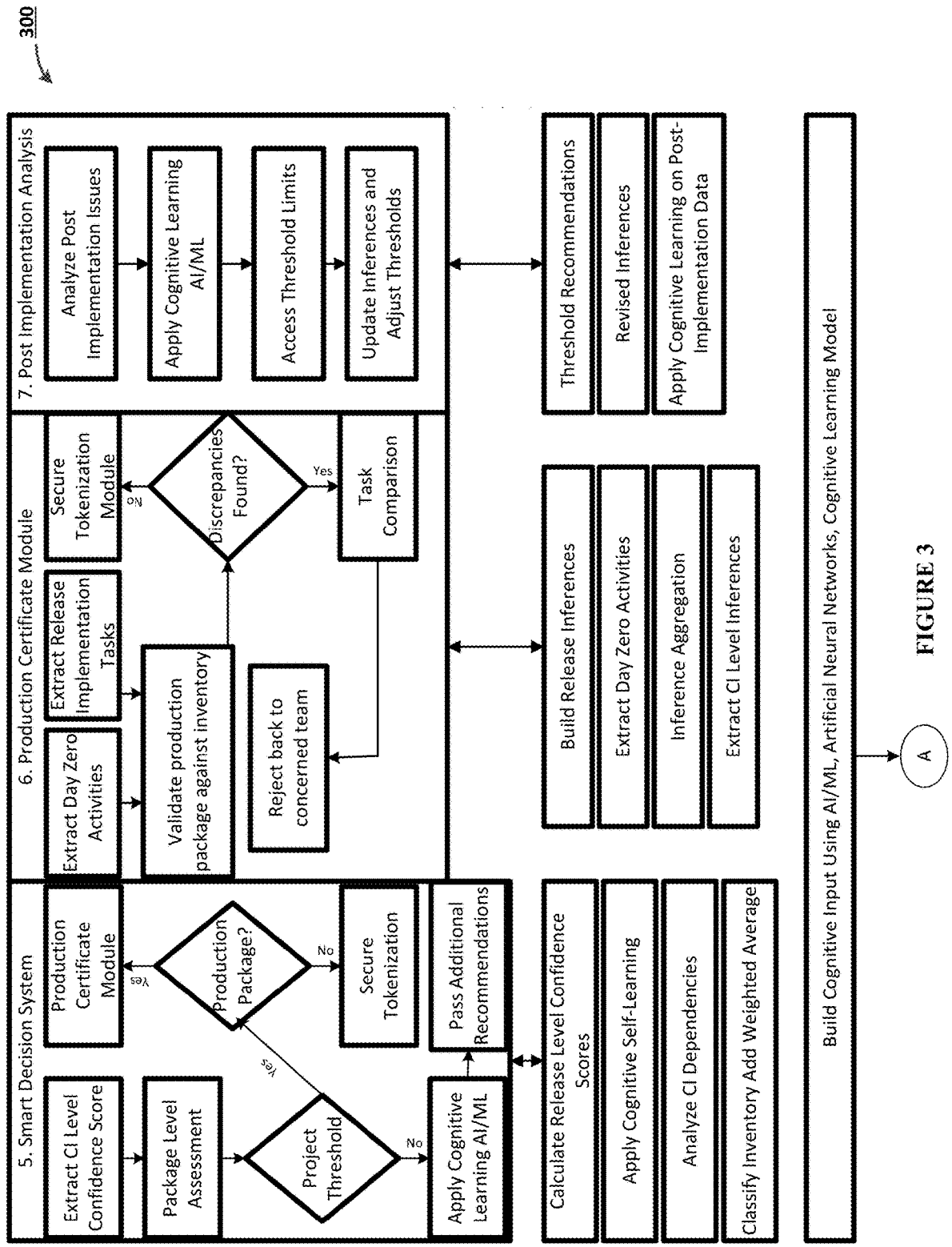
Figure 4:
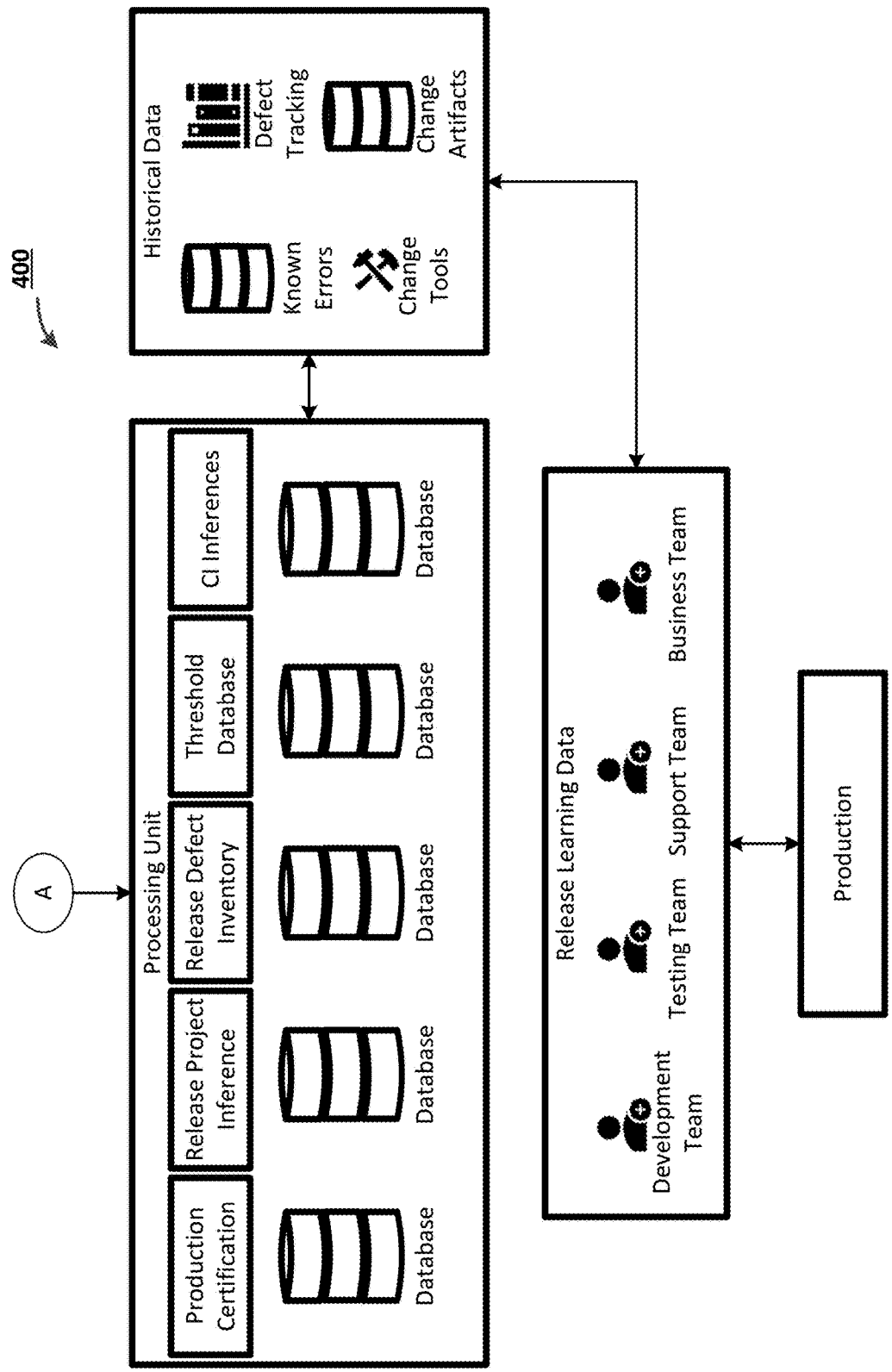
Figure 5:
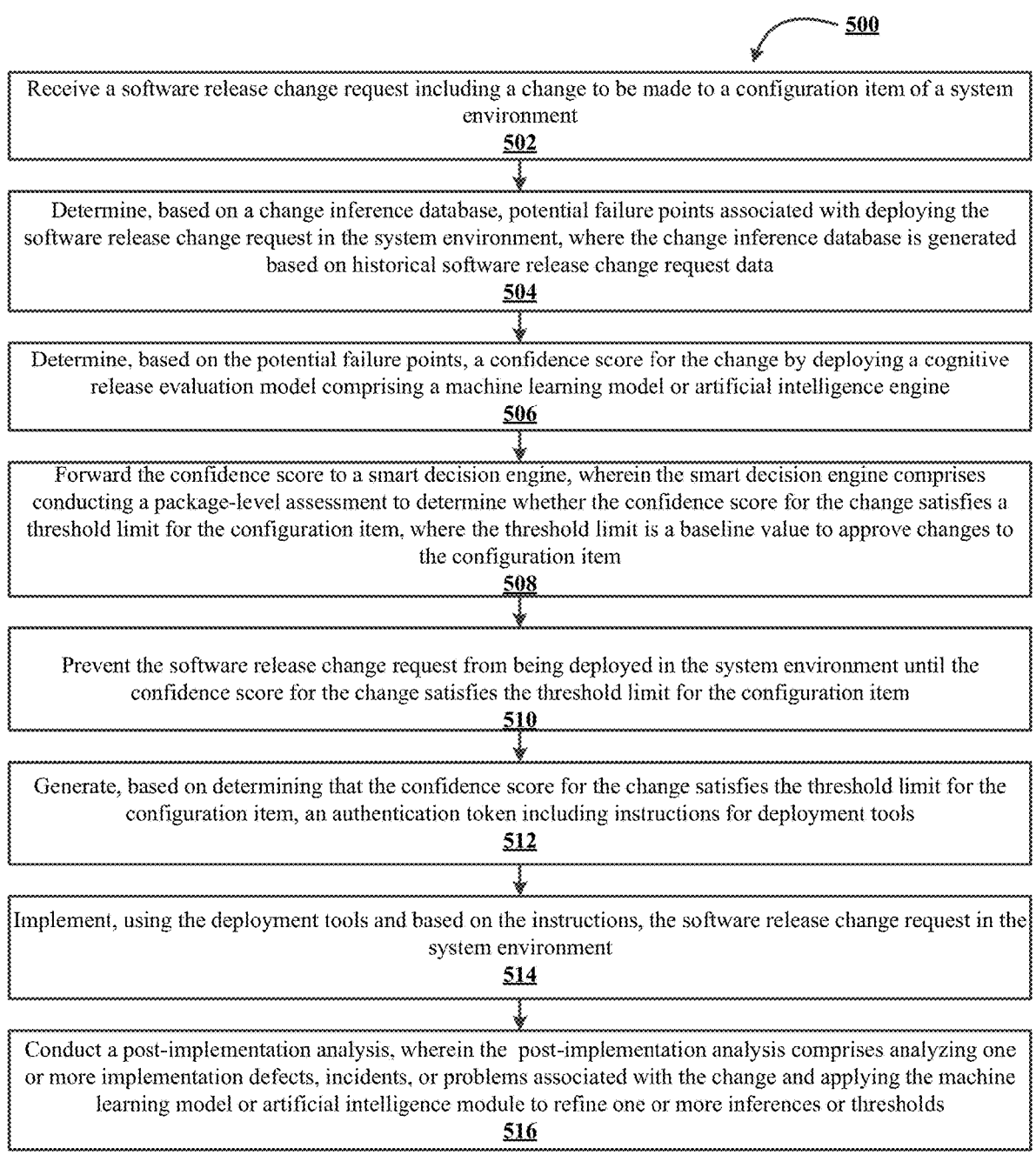

Having thus described embodiments of the invention in general terms, reference will now be made the accompanying drawings, wherein:

FIG. 1 illustrates technical components of a system for evaluating, validating, and implementing system environment production deployment tools using cognitive learning input, in accordance with an embodiment of the invention;

FIG. 2 illustrates a process flow for evaluating, validating, and implementing system environment production deployment tools using cognitive learning input, in accordance with an embodiment of the invention;

FIG. 3 illustrates a process flow for evaluating, validating, and implementing system environment production deployment tools using cognitive learning input, in accordance with an embodiment of the invention;

FIG. 4 illustrates a process flow for evaluating, validating, and implementing system environment production deployment tools using cognitive learning input, in accordance with an embodiment of the invention;

FIG. 5 illustrates a process flow 500 for evaluating, validating, and implementing system environment production deployment tools using cognitive learning input, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As noted, an electronic system may be configured to determine whether a user is authorized to make changes to a system environment. In response to determining that the user is authorized, the electronic system may implement a software release change request, provided by the user, including changes to be made to configuration items in a system environment. However, even authorized users may provide software release change requests that, when implemented and/or deployed in the system environment, cause negative impacts to one or more elements of the system environment, such as systems, data structures, source code, configuration files, data, hardware, and/or the like. Identifying, repairing, reporting, and/or the like of such negative impacts would consume significant computing resources, network resources, and financial resources. As an example, if the software release change request includes a change to a configuration item (e.g., a system, a data structure, source code, a configuration file, data, hardware, and/or the like), the unauthorized user may not be aware that if the configuration item is changed other configuration items must also be changed to maintain proper function of the system environment. When implemented, the change to the configuration item could crash one or more elements of the system, cause elements and/or the system environment to function improperly, and/or the like. Furthermore, the authorized user may have limited data for determining whether the change to the configuration item would have negative impacts. Available data may be limited in scope without providing a holistic view of the interoperable elements of the system environment. Even if enough data was available to such users, the users querying databases of information with the data and then processing the data to obtain some meaningful conclusion would consume significant computing resources, network resources, and financial resources.

Some embodiments described herein provide a system, a computer program product, and/or a method for evaluating, validating, and implementing software release change requests to a system environment based on artificial intelligence input. For example, a system (e.g., an electronic system for evaluating, validating, and implementing software release change requests to a system environment based on artificial intelligence input and/or the like) may be configured to receive software release change requests including changes to be made to configuration items in a system environment. The system may be configured to determine potential failure points associated with deploying the software release change requests in the system environment based on a change inference database generated using artificial intelligence and historical software release change request data. The system may be configured to determine confidence scores for the changes and whether the confidence scores satisfy threshold limits for the configuration items, where the threshold limits are baseline values to approve changes to the configuration items. The system may be configured to generate the confidence scores and the threshold limits using artificial intelligence and historical software release change request data. The system may be configured to prevent the software release change requests from being deployed in the system environment until the confidence scores satisfy the threshold limits. If the confidence scores satisfy the threshold limits, the system may be configured to generate authentication tokens for the software release change requests that include instructions for deployment tools, and then implement the software release change requests in the system environment using the deployment tools. The system may be configured to continuously update the confidence scores and threshold limits using artificial intelligence. By automatically evaluating the software release change requests using the change inference database, the confidence scores, and the threshold limits, the system conserves resources (e.g., financial resources, computing resources, network resources, and/or the like) that would otherwise be consumed by identifying, repairing, reporting, and/or the like negative impacts of the software release change requests on the system environment, users querying databases of information with the data and then processing the data to obtain some meaningful conclusion regarding potential negative impacts, and/or the like.

As used herein, an "entity" may be any institution employing information technology resources and particularly technology infrastructure configured for processing large amounts of data. Typically, the data may be related to products, services, and/or the like offered and/or provided by the entity, customers of the entity, other aspect of the operations of the entity, people who work for the entity, and/or the like. As such, the entity may be an institution, group, association, financial institution, establishment, company, union, authority, merchant, service provider, and/or or the like, employing information technology resources for processing large amounts of data.

As used herein, a "user" may be an individual associated with an entity. As such, in some embodiments, the user may be an individual having past relationships, current relationships or potential future relationships with an entity. In some embodiments, a "user" may be an employee (e.g., an associate, a project manager, a manager, an administrator, an internal operations analyst, and/or the like) of the entity and/or enterprises affiliated with the entity, capable of operating systems described herein. In some embodiments, a "user" may be any individual, another entity, and/or a system who has a relationship with the entity, such as a customer, a prospective customer, and/or the like. In some embodiments, a user may be a system performing one or more tasks described herein.

As used herein, a "user interface" may be any device or software that allows a user to input information, such as commands and/or data, into a device, and/or that allows the device to output information to the user. For example, a user interface may include an application programmer interface (API), a graphical user interface (GUI), and/or an interface to input computer-executable instructions that direct a processing device to carry out functions. The user interface may employ input and/or output devices to input data received from a user and/or output data to a user. Input devices and/or output devices may include a display, API, mouse, keyboard, button, touchpad, touch screen, microphone, speaker, LED, light, joystick, switch, buzzer, bell, and/or other devices for communicating with one or more users.

As used herein, a "resource" may generally refer to computing resources, computing services, objects, products, devices, goods, commodities, services, offers, discounts, currency, cash, cash equivalents, rewards, reward points, benefit rewards, bonus miles, cash back, credits, and/or the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, and/or the like.

As used herein, a "source retainer" may generally refer to an account, a system, and/or the like associated with a user and/or a type of resources, such as software, a checking account, a deposit account, a savings account, a credit account, a rewards account, a rewards points account, a benefit rewards account, a bonus miles account, a cash back account, and/or the like, which may be managed and/or maintained by an entity, such as a financial institution, an electronic resource transfer institution (e.g., a credit card company, a debit card company, a prepaid card company, and/or the like), a credit union, and/or the like.

As used herein, a "distribution" and/or an "allocation" may refer to any transaction, activities, and/or communication between one or more entities, between a user and one or more entities, and/or the like. A resource distribution and/or an allocation of resources may refer to any distribution of resources such as, but not limited to, provision of computing resources, provision of computing services, a payment, processing of funds, purchase of goods or services, a return of goods or services, a payment transaction, a credit transaction, other interactions involving a user's resource or account, and/or the like. Unless specifically limited by the context, a "resource distribution," an "allocation of resources," a "resource transfer," a "transaction," a "transaction event," and/or a "point of transaction event" may refer to any activity between a user, a merchant, an entity, and/or the like. In the context of an entity such as a financial institution, a resource transfer may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that invokes or is detectable by the financial institution.

In some embodiments, the term "module" with respect to an apparatus may refer to a hardware component of the apparatus, a software component of the apparatus, and/or a component of the apparatus that includes both hardware and software. In some embodiments, the term "chip" may refer to an integrated circuit, a microprocessor, a system-on-a-chip, a microcontroller, and/or the like that may either be integrated into the external apparatus, may be inserted and/or removed from the external apparatus by a user, and/or the like.

As used herein, an "engine" may refer to core elements of a computer program, part of a computer program that serves as a foundation for a larger piece of software and drives the functionality of the software, and/or the like. An engine may be self-contained but may include externally controllable code that encapsulates powerful logic designed to perform or execute a specific type of function. In one aspect, an engine may be underlying source code that establishes file hierarchy, input and/or output methods, how a part of a computer program interacts and/or communicates with other software and/or hardware, and/or the like. The components of an engine may vary based on the needs of the computer program as part of the larger piece of software. In some embodiments, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

As used herein, a "component" of an application may include a software package, a service, a resource, a module, and/or the like that includes a set of related functions and/or data. In some embodiments, a component may provide a source capability (e.g., a function, a business function, and/or the like) to an application including the component. In some embodiments, components of an application may communicate with each other via interfaces and may provide information to each other indicative of the services and/or functions that other components may utilize and/or how other components may utilize the services and/or functions. Additionally, or alternatively, components of an application may be substitutable such that a component may replace another component. In some embodiments, components may include objects, collections of objects, and/or the like.

As used herein, "authentication credentials" may be any information that may be used to identify a user. For example, a system may prompt a user to enter authentication information such as a username, a password, a token, a personal identification number (PIN), a passcode, biometric information (e.g., voice authentication, a fingerprint, and/or a retina scan), an answer to a security question, a unique intrinsic user activity, such as making a predefined motion with a user device, and/or the like. The authentication information may be used to authenticate the identity of the user (e.g., determine that the authentication information is associated with an account) and/or determine that the user has authority to access an account or system. In some embodiments, the system may be owned and/or operated by an entity. In such embodiments, the entity may employ additional computer systems, such as authentication servers, to validate and certify resources inputted by a plurality of users within the system. The system may further use authentication servers to certify the identity of users of the system, such that other users may verify the identity of the certified users. In some embodiments, the entity may certify the identity of the users. Furthermore, authentication information and/or permission may be assigned to and/or required from a user, application, computing node, computing cluster, and/or the like to access stored data within at least a portion of the system.

As used herein, an "interaction" may refer to any communication between one or more users, one or more entities or institutions, and/or one or more devices, nodes, clusters, and/or systems within the system environment described herein. For example, an interaction may refer to a transfer of data between devices, an accessing of stored data by one or more nodes of a computing cluster, a transmission of a requested task, and/or the like. In some embodiments, an interaction may refer to an entity, a user, a system, and/or a device providing an advertisement, information, data, a user interface, and/or the like to another entity, another user, another system, and/or another device.

FIG. 1 presents an exemplary block diagram of a system environment 100 for evaluating, validating, and implementing software release change requests to a system environment based on artificial intelligence input within a technical environment, in accordance with an embodiment of the invention. FIG. 1 provides a system environment 100 that includes specialized servers and a system communicably linked across a distributive network of nodes required to perform functions of process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile computing device, a non-mobile computing device, and/or the like. The user may be a person who uses the user input system 140 to access, view modify, interact with, and/or the like information, data, images, video, and/or the like. The user may be a person who uses the user input system 140 to initiate, perform, monitor, and/or the like changes and/or modifications to one or more systems, applications, services, and/or the like. The one or more systems, applications, services, and/or the like may be configured to communicate with the system 130, input information onto a user interface presented on the user input system 140, and/or the like. The applications stored on the user input system 140 and the system 130 may incorporate one or more parts of any process flow described herein.

As shown in FIG. 1, the system 130 and the user input system 140 are each operatively and selectively connected to the network 110, which may include one or more separate networks. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology. The network 110 may include one or more wired and/or wireless networks. For example, the network 110 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

In some embodiments, the system 130 and the user input system 140 may be used to implement processes described herein, including user-side and server-side processes for evaluating, validating, and implementing software release change requests to a system environment based on artificial intelligence input, in accordance with an embodiment of the present invention. The system 130 may represent various forms of digital computers, such as laptops, desktops, workstations, personal digital assistants, servers, blade servers, mainframes, automated teller machines, and/or the like. The user input system 140 may represent various forms of devices, such as personal digital assistants, cellular telephones, smartphones, smart glasses, desktops, workstations, automated teller machines, and/or the like. The components shown here, their connections, their relationships, and/or their functions, are meant to be exemplary only, and are not meant to limit implementations of the inventions described and/or claimed in this document.

In some embodiments, the system 130 may include a processor 102, memory 104, a storage device 106, a high-speed interface 108 connecting to memory 104, high-speed expansion ports 111, and a low-speed interface 112 connecting to low-speed bus 114 and storage device 106. Each of the components 102, 104, 106, 108, 111, and 112 may be interconnected using various buses, and may be mounted on a common motherboard or in other manners as appropriate. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130 may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The memory 104 may store information within the system 130. In one implementation, the memory 104 may be a volatile memory unit or units, such as volatile random-access memory (RAM) having a cache area for the temporary storage of information. In another implementation, the memory 104 may be a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 may be capable of providing mass storage for the system 130. In one aspect, the storage device 106 may be or contain a computer-readable medium, such as a floppy disk device, a hard disk device, an optical disk device, a tape device, a flash memory and/or other similar solid state memory device, and/or an array of devices, including devices in a storage area network or other configurations. A computer program product may be tangibly embodied in an information carrier. The computer program product may also contain instructions that, when executed, perform one or more methods, such as those described herein. The information carrier may be a non-transitory computer-readable or machine-readable storage medium, such as the memory 104, the storage device 106, and/or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 may manage bandwidth-intensive operations for the system 130, while the low-speed interface 112 and/or controller manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In some embodiments, low-speed interface 112 and/or controller is coupled to storage device 106 and low-speed bus 114 (e.g., expansion port). The low-speed bus 114, which may include various communication ports (e.g., USB, Bluetooth, Ethernet, wireless Ethernet), may be coupled to one or more input/output devices, such as a keyboard, a pointing device, a scanner, and/or a networking device such as a switch or router (e.g., through a network adapter).

The system 130 may be implemented in a number of different forms, as shown in FIG. 1. For example, it may be implemented as a standard server or multiple times in a group of such servers. Additionally, or alternatively, the system 130 may be implemented as part of a rack server system, a personal computer, such as a laptop computer, and/or the like. Alternatively, components from system 130 may be combined with one or more other same or similar systems and the user input system 140 may be made up of multiple computing devices communicating with each other.

FIG. 1 also illustrates a user input system 140, in accordance with an embodiment of the invention. The user input system 140 may include a processor 152, memory 154, an input/output device such as a display 156, a communication interface 158, and a transceiver 160, among other components, such as one or more image sensors. The user input system 140 may also be provided with a storage device, such as a microdrive and/or the like, to provide additional storage. Each of the components 152, 154, 158, and 160, may be interconnected using various buses, and several of the components may be mounted on a common motherboard or in other manners as appropriate.

The processor 152 may be configured to execute instructions within the user input system 140, including instructions stored in the memory 154. The processor 152 may be implemented as a chipset of chips that include separate and multiple analog and/or digital processors. The processor 152 may be configured to provide, for example, for coordination of the other components of the user input system 140, such as control of user interfaces, applications run by user input system 140, and/or wireless communication by user input system 140.

The processor 152 may be configured to communicate with the user through control interface 164 and display interface 166 coupled to a display 156. The display 156 may be, for example, a Thin-Film-Transistor Liquid Crystal Display (TFT LCD) or an Organic Light Emitting Diode (OLED) display, and/or other appropriate display technology. An interface of the display 156 may include appropriate circuitry and may be configured for driving the display 156 to present graphical and other information to a user. The control interface 164 may receive commands from a user and convert them for submission to the processor 152. In addition, an external interface 168 may be provided in communication with processor 152 to enable near area communication of user input system 140 with other devices. External interface 168 may provide, for example, for wired communication in some implementations, or for wireless communication in other implementations, and multiple interfaces may also be used.

The memory 154 may store information within the user input system 140. The memory 154 may be implemented as one or more of a computer-readable medium or media, a volatile memory unit or units, or a non-volatile memory unit or units. Expansion memory may also be provided and connected to user input system 140 through an expansion interface (not shown), which may include, for example, a Single In Line Memory Module (SIMM) card interface. Such expansion memory may provide extra storage space for user input system 140 and/or may store applications and/or other information therein. In some embodiments, expansion memory may include instructions to carry out or supplement the processes described above and/or may include secure information. For example, expansion memory may be provided as a security module for user input system 140 and may be programmed with instructions that permit secure use of user input system 140. Additionally, or alternatively, secure applications may be provided via the SIMM cards, along with additional information, such as placing identifying information on the SIMM card in a secure manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In some embodiments, a computer program product may be tangibly embodied in an information carrier. The computer program product may contain instructions that, when executed, perform one or more methods, such as those described herein. The information carrier may be a computer-readable or machine-readable medium, such as the memory 154, expansion memory, memory on processor 152, and/or a propagated signal that may be received, for example, over transceiver 160 and/or external interface 168.

In some embodiments, the user may use the user input system 140 to transmit and/or receive information and/or commands to and/or from the system 130. In this regard, the system 130 may be configured to establish a communication link with the user input system 140, whereby the communication link establishes a data channel (wired and/or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, and/or the like.

The user input system 140 may communicate with the system 130 (and one or more other devices) wirelessly through communication interface 158, which may include digital signal processing circuitry. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker (e.g., in a handset) of user input system 140. Such sound may include sound from voice telephone calls, may include recorded sound (e.g., voice messages, music files, and/or the like) and may also include sound generated by one or more applications operating on the user input system 140, and in some embodiments, one or more applications operating on the system 130.

Various implementations of the systems and techniques described here may be realized in digital electronic circuitry, integrated circuitry, specially designed ASICs (application specific integrated circuits), computer hardware, firmware, software, and/or combinations thereof. Such various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and/or at least one output device.

Computer programs (e.g., also referred to as programs, software, applications, code, and/or the like) may include machine instructions for a programmable processor, and may be implemented in a high-level procedural and/or object-oriented programming language, and/or in assembly/machine language. As used herein, the terms "machine-readable medium" and/or "computer-readable medium" may refer to any computer program product, apparatus and/or device (e.g., magnetic discs, optical disks, memory, Programmable Logic Devices (PLDs), and/or the like) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and/or techniques described herein may be implemented on a computer having a display device (e.g., a CRT (cathode ray tube), an LCD (liquid crystal display) monitor, and/or the like) for displaying information to the user, a keyboard by which the user may provide input to the computer, and/or a pointing device (e.g., a mouse or a trackball) by which the user may provide input to the computer. Other kinds of devices may be used to provide for interaction with a user as well. For example, feedback provided to the user may be any form of sensory feedback (e.g., visual feedback, auditory feedback, and/or tactile feedback). Additionally, or alternatively, input from the user may be received in any form, including acoustic, speech, and/or tactile input.

The systems and techniques described herein may be implemented in a computing system that includes a back end component (e.g., as a data server), that includes a middleware component (e.g., an application server), that includes a front end component (e.g., a client computer having a graphical user interface or a Web browser through which a user may interact with an implementation of the systems and techniques described here), and/or any combination of such back end, middleware, and/or front end components. Components of the system may be interconnected by any form or medium of digital data communication (e.g., a communication network). Examples of communication networks include a local area network ("LAN"), a wide area network ("WAN"), and/or the Internet.

In some embodiments, computing systems may include clients and servers. A client and server may generally be remote from each other and typically interact through a communication network. The relationship of client and server may arise by virtue of computer programs running on the respective computers and having a client-server relationship to each other.

The embodiment of the system environment 100 illustrated in FIG. 1 is exemplary and other embodiments may vary. As another example, in some embodiments, the system 130 includes more, less, or different components. As another example, in some embodiments, some or all of the portions of the system environment 100, the system 130, and/or the user input system 140 may be combined into a single portion. Likewise, in some embodiments, some or all of the portions of the system environment 100, the system 130, and/or the user input system 140 may be separated into two or more distinct portions.

In some embodiments, the system environment may 100 include one or more enterprise change management systems, integrated change control gateway systems, change control modules, cognitive change evaluation and assistance systems, secure tokenization modules, deployment authentication modules, implementation modules, production modules and/or systems, legacy systems, middleware systems, development operations systems, big data systems, mobile technology systems, and/or hardware systems (e.g., one or more of which may be similar to the system 130 and/or the user input system 140) associated with one or more entities (e.g., businesses, merchants, financial institutions, card management institutions, software and/or hardware development companies, software and/or hardware testing companies, and/or the like). In some embodiments, the one or more enterprise change management systems, integrated change control gateway systems, change control modules, cognitive change evaluation and assistance systems, secure tokenization modules, deployment authentication modules, implementation modules, and/or production modules and/or systems may perform one or more of the steps described herein with respect to the process flows described herein with respect to FIGS. 2-4.

FIG. 2 illustrates a process flow 200 for evaluating, validating, and implementing system environment production deployment tools using cognitive learning input, in accordance with an embodiment of the invention. In some embodiments, a release management module is configured to interface with one or more enterprise change management systems, integrated change control gateway systems, change control modules, cognitive change evaluation and assistance systems, secure tokenization modules, deployment authentication modules, implementation modules, production modules and/or systems, and/or the like (e.g., similar to one or more of the systems described herein with respect to FIG. 1) may perform one or more of the steps of process flow 200. It is understood that the present invention is primarily focused on effective assessment of software releases. More detail on evaluation of change requests is contained in previously filed U.S. application Ser. No. 17/582,282, which is incorporated herein by reference in its entirety.

As shown in FIG. 2, the process flow 200 may include a release management module, a series of planning, building, unit tests, system tests, integration tests, and user acceptance tests, a deployment package, a cognitive release evaluation system, a smart decision engine, a production certificate module, a post-implementation analysis module, a secure tokenization module, and/or the like. The release management module may include and/or store one or more change policies, one or more change management tools, one or more change artifacts, and one or more change governance modules and/or systems.

An entity's information technology system may include many components, elements, configuration items, and/or the like in production, such as source code, data configuration files, hardware, and/or the like. Performance of such components, elements, configuration items, and/or the like may determine an experience of a user (e.g., a customer) with the entity. Accordingly, changes implemented in production may impact production stability, which can lead to negative reputational impacts to the entity.

In conventional system environments, changes implemented in production may cause issues because the changes are not properly assessed before the changes are deployed in production. Thus, unwanted changes may be pushed into production, thereby forcing restoration of the system environment by a production team, which consumes significant computing resources, network resources, and financial resources.

In some conventional system environments, entities may have change management tools, change governance bodies (e.g., committees and/or the like), and/or change policies establishing standards to which production changes must adhere. However, such change management tools, change governance bodies, and/or change policies do not directly communicate with deployment tools and/or implementation modules that push the changes into production.

Furthermore, deployment tools and/or implementation modules do not have any dependence on change management tools, change governance bodies, and/or change policies. Conventionally, a user manually checks whether a change deployed in production is associated with a software release change request. Thus, changes may be pushed into production without a software release change request, which can negatively impact the system environment. Additionally, changes may not be tested properly and/or changes may not be approved but the changes are still pushed into production, which can also negatively impact the system environment.

To remedy such issues, and as shown in FIG. 2, some embodiments of the process flow 200 include preventing changes from being moved into production without a valid software release change request that has been tested and/or evaluated. Additionally, or alternatively, some embodiments of the process flow 200 include automatically assessing and/or evaluating changes based on, for example, criticality of a configuration item impacted by the change and/or historical data associated with software release change requests (e.g., historical software release change request data).

The release management module performs end-to-end release management which includes release planning, identifying configuration items, software development methodology to be applied, unit, system, integration and final deployment. This module also defines overall release level as well as individual project level threshold limits.

As further down in FIG. 200, the process flow 200 may include inventory classification module. The inventory classification module classifies all configuration items based on the type and release project and assigns the threshold values. In some embodiments, the process flow 200 may include defining, with the enterprise change management system, a workflow for a software release change request and tracking, with the enterprise change management system, each stage of the software release change request from planning, building, testing, deploying, and/or the like.

As shown in FIG. 2, the process flow 200 may include providing, with the release management module and/or the inventory classification module, a deployment package or deployment module. It is understood that the deployment module creates the deployment package for the code based on data received in the form of planning data, build data, unit testing data, system testing data, integration test data, and user acceptance testing data. As indicated in FIG. 2, historical data may inform an inventory classification process which may further inform the steps described above. As planning data, build data, unit testing data, system testing data, integration test data, and user acceptance testing data is continuously received and updated by the release management module, the data may form a feedback loop where up-to-date information is constantly made available to the deployment module to create a deployment package for the cognitive release evaluation system.

As shown in FIG. 2, the cognitive release evaluation system is a core module which applies cognitive learning model and artificial intelligent/machine learning (AI/ML) and builds data needed for other downstream modules, such as the smart decision engine, the production certificate module, the post-implementation analysis module, and the secure tokenization module. The cognitive release evaluation system builds project-level inferences from all the configuration-item related inferences generated by the release management module. The cognitive release evaluation system also extracts production certification related information for use by downstream modules, such as the smart decision engine, the production certificate module, the post-implementation analysis module, and the secure tokenization module.

As shown in FIG. 2, the process flow 200 may also include the smart decision engine. The smart decision engine is a module which extracts a confidence interval (CI) level confidence score and then applies a statistical model to calculate release project-level failure chance assessment(s). If the failure change assessment is not approved or does not meet a certain threshold, it may not be approved and will be forwarded to appropriate systems or users for additional recommendations. For instance, the smart decision engine may generate a confidence score for the software release change request and a threshold limit (e.g., associated with one or more configuration items affected by the software release change request). In some embodiments, the system uses cognitive learning/natural language processing and artificial intelligence/machine learning to calculate the confidence score. The process flow 200 may include determining whether the confidence score is greater than the threshold limit, where higher confidence scores are associated with higher likelihoods of software release change request not negatively impacting the system environment. Some embodiments are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

As shown in FIG. 2, the process flow 200 may also include a production package module. This production package module validates a token generated in the smart decision engine module and promotes a configuration item to the next stage, which is the secure tokenization module. The secure tokenization module creates a secure token for each of the previous stages or modules described herein. In some embodiments, the code may be further promoted as either non-production code, or may be promoted to be implemented by the release management module.

As shown in FIG. 2, the process flow 200 may also include a production implementation analysis module. This production implementation analysis module performs additional due diligence of activities which include validation of day-zero activities and provides approval for production deployment. If there are any discrepancies identified by the production implementation analysis module, they are sent back to the development team. As shown in FIG. 2, this production implementation analysis module may be informed by data received from the smart decision engine module as it sets build threshold limits, as well as the cognitive release evaluation system module and the implementation module. As shown in FIG. 2, the process flow 200 may also include historical data. As shown in FIG. 2, in some embodiments, the historical data may be classified as known errors, change tools, defect tracking data, change artifacts, and/or the like, all of which may be used to further inform the cognitive release evaluation system module.

It is understood that the cognitive release evaluation system may be called for each item or module in a deployment package. In some embodiments, this may include data mining, and this stage reads all the historical data from defect tracking tools, past release incidents and problems, and change tools, and then applies a data mining algorithm in order to write information in a sequential order. In some embodiments, this may include data sanitization, wherein the data from a previous step is read, and the cognitive release evaluation system module sanitizes the data and builds a new data set with relevant information related to a configuration item. In some embodiments, this may include applying cognitive learning, wherein a core module reads the information, applies a cognitive learning and natural language processing algorithm, and presents the data to the next module. This module sets the evaluation parameters which are used by next modules.

In some embodiments, this may include building cognitive intelligence, wherein the cognitive release evaluation system applies artificial neural networks on the cognitive learning data and builds valid inferences as well as identifies the qualitative failure chance associated for each activity on the configuration items.

In some embodiments, the process flow 200 may include storing, with the deployment authentication module, the token in a database (e.g., the deployment tool database, a token database, a key database, and/or the like) with the change window information. Additionally, or alternatively, the process flow 200 may include using the deployment authentication module as a wrapper around all deployment tools used by an entity irrespective of the technology, platform, and/or the like with which the deployment tool is associated. In some embodiments, the process flow 200 may include using the deployment authentication module as a vault for configuration items in the system environment (e.g., such that a user may only use deployment tools on the configuration items based on a valid authentication of the user and in compliance with the valid token from the secure tokenization module).

As shown in FIG. 2, the process flow 200 may include obtaining, from the employment tool database and based on the token, the deployment tool details and creating an authentication token (e.g., based on the token, the deployment tool details, the change window, and/or the like). In some embodiments, the process flow 200 may include receiving, from a user device associated with a user, authentication credentials associated with the user device and/or the user, as shown in FIG. 2. Additionally, or alternatively, the process flow 200 may include In some embodiments, the process flow 200 may include receiving, from a federated single sign on system, an authentication of a user device and/or a user attempting to access the deployment tools and/or the implementation module to implement the software release change request.

As shown in FIG. 2, the process flow 200 may include obtaining, based on authentication of a user device and/or a user, the information from the deployment tool database and validating a change package based on the token, the deployment tool details, the change window, instructions for deployment tools to implement the software release change request, and/or the like. In some embodiments, the process flow 200 may include providing, with the deployment authentication module, access to the implementation module to a user device and/or a user.

As shown in FIG. 2, the process flow 200 may include providing the change package to the implementation module. For example, a release team and/or a deployment team may access the implementation module via the deployment authentication module and implement the software release change request (e.g., by deploying code with implementation procedures, using the change package, information provided in the change package, and/or the like).

As shown in FIG. 2, the process flow 200 may include providing, with the implementation module, information regarding the implementation process to the cognitive change evaluation and assistance system. For example, the cognitive change evaluation and assistance system may process information regarding the implementation process and assist the implementation module with implementing the software release change request (e.g., by providing instructions to use one or more of the deployment tools and/or the like).

Process flow 200 may include additional embodiments, such as any single embodiment or any combination of embodiments described below and/or in connection with one or more other processes described elsewhere herein. Although FIG. 2 shows example blocks of process flow 200, in some embodiments, process flow 200 may include additional blocks, fewer blocks, different blocks, or differently arranged blocks than those depicted in FIG. 2. Additionally, or alternatively, two or more of the blocks of process flow 200 may be performed in parallel.

FIG. 3 illustrates a process flow 300 for evaluating, validating, and implementing system environment production deployment tools using cognitive learning input, in accordance with an embodiment of the invention In some embodiments, a release management module is configured to interface with one or more enterprise change management systems, integrated change control gateway systems, change control modules, cognitive change evaluation and assistance systems, secure tokenization modules, deployment authentication modules, implementation modules, production modules and/or systems, and/or the like (e.g., similar to one or more of the systems described herein with respect to FIG. 1) may perform one or more of the steps of process flow 300.

As shown in FIG. 3, the process flow 300 may include data which is used by the smart decision system module. In some embodiments, this may include extracting and assigned a CI level confidence score. As shown in FIG. 3, the process flow 300 may include assigning the quantitative failure chance score to the each operation or configuration item based on the cognitive intelligence built from previous modules to produce a package level assessment, which is then compared to a project threshold to determine if the production package passes or not.

In further embodiments, the smart decision system module calculates the confidence score of the proposed change based in the failure chance and criticality of a particular configuration item. In still further embodiments, the CI inference may be used to build inferences for each of the configuration items in the package using natural language processing and cognitive learning.

As shown in FIG. 3, the process flow 300 may include the smart decision system module extracting inferences, wherein the module extracts all the CI inferences of all configurations in a given package. The smart decision system module also identifies the interdependencies between the cognitive inferences.

As shown in FIG. 3, the process flow 300 may include the production certificate module. This module validates production package and ensures that all CI are listed and in the correct sequential order. It also verified all day zero activities against the release task inventory. This module also applies AI knowledge processing on the production package and test cases and compares then with production inferences. This module identifies the discrepancies, and if they are significant, then a package is rejected. If not, the package is sent to a production certificate module which aggregates the inferences and applies artificial neural networks, artificial intelligence algorithms and builds project-level inferences. In this way, the production certificate module may extract day-zero activities and production certification inferences, wherein the production certificate module creates inferences needed for production certification. The production certificate module also extracts the day-zero activities for each CI from inference database. The production certificate module may apply cognitive self-learning on post implementation data in order to identify any discrepancies. The production certificate module analyzes data and applies cognitive learning on the data to give recommendation for thresholds, as well as updates and aggregates the inference data.

As shown in FIG. 3, the process flow 300 may include the post implementation analysis module. In this way, the post implementation data is analyzed to identify any post-implementation issues. As shown in FIG. 3, the process flow 300 may include applying a cognitive learning AI/ML model, as indicated in module 4 of FIG. 2. In this way the post-implementation analysis module may access threshold limits either predefined or defined by other modules such as the production certificate module or smart decision system module. The post implementation analysis module may update inferences and adjust thresholds as necessitated by insights from post implementation data. The post implementation analysis module analyzes the implementation defects, incident, problem, and change data, and applies cognitive learning to refine the inferences and thresholds. These inferences drawn on this module can be used as a "lessons learned document" for future releases. As indicated in FIG. 3, all of the modules shown collectively are used to build the cognitive input using AI/ML, artificial network, and cognitive learning models, in order to proceed to the steps shown in FIG. 4, as indicated in the process flow continuation marker "A".

FIG. 4 illustrates a process flow 400 for evaluating, validating, and implementing system environment production deployment tools using cognitive learning input, in accordance with an embodiment of the invention. In some embodiments, a release management module is configured to interface with one or more enterprise change management systems, integrated change control gateway systems, change control modules, cognitive change evaluation and assistance systems, secure tokenization modules, deployment authentication modules, implementation modules, production modules and/or systems, and/or the like (e.g., similar to one or more of the systems described herein with respect to FIG. 1) may perform one or more of the steps of process flow 400.

As shown the process flow of FIG. 3 continues from marker "A" to the flow of FIG. 4 in process flow 400, which first indicates the processing unit. The processing unit may include production certification, release project inferences, release defect inventory, threshold database, and CI inferences, all of which are stored in respective databases for reference by the overall system architecture. Any or all of these processing unit data outputs may be drawn from as historical data. Historical data, as shown in FIG. 4, may include known errors, defect tracking data, change tools utilized by previous production packages, and change artifacts identified in the process of analyzing and implementing software release change requests, change thresholds, or other determinations by the enterprise change management systems, integrated change control gateway systems, change control modules, cognitive change evaluation and assistance systems, secure tokenization modules, deployment authentication modules, implementation modules, production modules and/or systems, and/or the like.

As shown in FIG. 4, the data produced by any of the various modules, including the enterprise change management systems, integrated change control gateway systems, change control modules, cognitive change evaluation and assistance systems, secure tokenization modules, deployment authentication modules, implementation modules, production modules and/or systems, and/or the like, may be accessed by various teams of users and systems, including a development team, a testing team, a support team, and/or a business team, before the software release change request is implanted in production, as indicated toward the bottom of FIG. 4.

FIG. 5 illustrates a process flow 500 for evaluating, validating, and implementing system environment production deployment tools using cognitive learning input, in accordance with an embodiment of the invention. As shown in block 502, the process flow 500 may begin by receiving a software release change request including a change to be made to a configuration item of a system environment. As further shown in block 504, the process flow 500 may include determining, based on a change inference database, potential failure points associated with deploying the software release change request in the system environment, where the change inference database is generated based on historical software release change request data. For example, an integrated change control gateway system may determine, based on a change inference database, potential failure points associated with deploying the software release change request in the system environment. In some embodiments, the change inference database may be generated based on historical software release change request data.

As shown in block 506, the process flow 500 may include determining, based on the potential failure points, a confidence score for the release. For example, an integrated change control gateway system may determine, based on the potential failure points, a confidence score for the change by deploying a cognitive release evaluation model, which may comprise one or more machine learning or artificially intelligent models for determination of software release change request thresholds.

As shown in block 508, the process flow 500 may include forwarding the confidence score to a smart decision engine, wherein the smart decision engine comprises conducting a package-level assessment to determine whether the confidence score for the change satisfies a threshold limit for the configuration item, and determining whether the confidence score for the change satisfies a threshold limit for the configuration item, where the threshold limit is a baseline value to approve changes to the configuration item. For example, an integrated change control gateway system may determine whether the confidence score for the change satisfies a threshold limit for the configuration item. In some embodiments, the threshold limit may be a baseline value to approve changes to the configuration item.

As shown in block 510, the process flow 500 may include preventing the software release change request from being deployed in the system environment until the confidence score for the change satisfies the threshold limit for the configuration item. For example, an integrated change control gateway system may prevent the software release change request from being deployed in the system environment until the confidence score for the change satisfies the threshold limit for the configuration item.

As shown in block 512, the process flow 500 may include generating, based on determining that the confidence score for the change satisfies the threshold limit for the configuration item, an authentication token including instructions for deployment tools. For example, an integrated change control gateway system may generate, based on determining that the confidence score for the change satisfies the threshold limit for the configuration item, an authentication token including instructions for deployment tools.

As shown in block 514, the process flow 500 may include implementing, using the deployment tools and based on the instructions, the software release change request in the system environment. For example, an integrated change control gateway system may implement, using the deployment tools and based on the instructions, the software release change request in the system environment.

As shown in block 516, the process flow 500 may include conducting a post-implementation analysis, wherein the post-implementation analysis comprises analyzing one or more implementation defects, incidents, or problems associated with the change and applying the machine learning model or artificial intelligence module to refine one or more inferences or thresholds.

Process flow 500 may include additional embodiments, such as any single embodiment or any combination of embodiments described below and/or in connection with one or more other processes described elsewhere herein.

In a first embodiment, the process flow 500 may include generating, based on the historical software release change request data, the change inference database.

In a second embodiment alone or in combination with the first embodiment, the process flow 500 may include when generating the change inference database, generating the change inference database using a first machine learning model, where the first machine learning model is trained based on the historical software release change request data.

In a third embodiment alone or in combination with any of the first through second embodiments, the process flow 500 may include, when generating the change inference database, analyzing the historical software release change request data using natural language processing, and, when determining the potential failure points associated with deploying the software release change request in the system environment, analyzing the software release change request using the natural language processing.

In a fourth embodiment alone or in combination with any of the first through third embodiments, the process flow 500 may include, after implementing the software release change request in the system environment, retraining the first machine learning model based on the historical software release change request data, the software release change request, and/or an outcome of implementing the software release change request in the system environment and updating the change inference database using the first machine learning model.

In a fifth embodiment alone or in combination with any of the first through fourth embodiments, the process flow 500 may include determining, based on the historical software release change request data, the threshold limit for each configuration item of the system environment.

In a sixth embodiment alone or in combination with any of the first through fifth embodiments, the process flow 500 may include, when determining the threshold limit for each configuration item of the system environment, determining the threshold limit for each configuration item of the system environment using a second machine learning model, where the second machine learning model is trained based on the historical software release change request data.

In a seventh embodiment alone or in combination with any of the first through sixth embodiments, the process flow 500 may include, after implementing the software release change request in the system environment, retraining the second machine learning model based on the historical software release change request data, the software release change request, and an outcome of implementing the software release change request in the system environment and updating the threshold limit for each configuration item of the system environment using the second machine learning model.

In an eighth embodiment alone or in combination with any of the first through seventh embodiments, the process flow 500 may include, when preventing the software release change request from being deployed in the system environment, generating, based on determining that the confidence score for the change satisfies the threshold limit for the configuration item, based on the change, and based on a change window for the software release change request, a secure token for the software release change request, where the secure token is only valid during the change window.

In a ninth embodiment alone or in combination with any of the first through eighth embodiments, the process flow 500 may include, when preventing the software release change request from being deployed in the system environment, determining whether the secure token is valid.

In a tenth embodiment alone or in combination with any of the first through ninth embodiments, the process flow 500 may include, when generating the authentication token, generating the authentication token based on determining that the secure token is valid, based on a deployment tool database, and based on the secure token.

In an eleventh embodiment alone or in combination with any of the first through tenth embodiments, the software release change request may include multiple changes to be made to the configuration item and other changes to be made to other configuration items of the system environment, and the process flow 500 may include, when determining the confidence score, determining, based on the potential failure points, confidence scores for the multiple changes and other confidence scores for the other changes and, when determining whether the confidence score for the change satisfies the threshold limit for the configuration item, determining whether the confidence scores for the multiple changes satisfy the threshold limit for the configuration item and determining whether the other confidence scores for the other changes satisfy other threshold limits for the other configuration items.

In a twelfth embodiment alone or in combination with any of the first through eleventh embodiments, the process flow 500 may include determining, based on the historical software release change request data, classifications for historical software release change requests, where the classifications include configuration items of the system environment and determining, based on the software release change request, the classifications impacted by the software release change request.

In a thirteenth embodiment alone or in combination with any of the first through twelfth embodiments, the confidence score may be a probability of successful implementation of the software release change request in the system environment without negatively impacting other configuration items in the system environment.

Although FIG. 5 shows example blocks of process flow 500, in some embodiments, process flow 500 may include additional blocks, fewer blocks, different blocks, or differently arranged blocks than those depicted in FIG. 5. Additionally, or alternatively, two or more of the blocks of process flow 500 may be performed in parallel.

In some embodiments, the system may be configured to implement any of the following applicable machine learning algorithms either singly or in combination: supervised learning (e.g., using logistic regression, using back propagation neural networks, using random forests, decision trees, and/or the like), unsupervised learning (e.g., using an Apriori algorithm, using K-means clustering), semi-supervised learning, reinforcement learning (e.g., using a Q-learning algorithm, using temporal difference learning), and any other suitable learning style. Each module of the system may implement any one or more of: a regression algorithm (e.g., ordinary least squares, logistic regression, stepwise regression, multivariate adaptive regression splines, locally estimated scatterplot smoothing, and/or the like), an instance-based method (e.g., k-nearest neighbor, learning vector quantization, self-organizing map, and/or the like), a regularization method (e.g., ridge regression, least absolute shrinkage and selection operator, elastic net, and/or the like), a decision tree learning method (e.g., classification and regression tree, iterative dichotomiser 3, C4.5, chi-squared automatic interaction detection, decision stump, random forest, multivariate adaptive regression splines, gradient boosting machines, and/or the like), a Bayesian method (e.g., naïve Bayes, averaged one-dependence estimators, Bayesian belief network, and/or the like), a kernel method (e.g., a support vector machine, a radial basis function, an LDA, and/or the like), a clustering method (e.g., k-means clustering, expectation maximization, and/or the like), an associated rule learning algorithm (e.g., an Apriori algorithm, an Eclat algorithm, and/or the like), an artificial neural network model (e.g., a Perceptron method, a back-propagation method, a Hopfield network method, a self-organizing map method, a learning vector quantization method, and/or the like), a deep learning algorithm (e.g., a restricted Boltzmann machine, a deep belief network method, a convolution network method, a stacked auto-encoder method, and/or the like), a dimensionality reduction method (e.g., principal component analysis, partial least squares regression, Sammon mapping, multidimensional scaling, projection pursuit, and/or the like), an ensemble method (e.g., boosting, bootstrapped aggregation, AdaBoost, stacked generalization, gradient boosting machine method, random forest method, and/or the like), and any suitable form of machine learning algorithm. Each processing portion of the system may additionally or alternatively leverage a probabilistic module, heuristic module, deterministic module, or any other suitable module leveraging any other suitable computation method, machine learning method or combination thereof. However, any suitable machine learning approach may otherwise be incorporated in the system. Further, any suitable model (e.g., machine learning, non-machine learning, and/or the like) may be used in generating data relevant to the system. In some embodiments, the one or more machine learning algorithms may be predictive modeling algorithms configured to use data and statistics to predict outcomes with forecasting models.

In some embodiments, the machine learning models may be generated by training on historical data associated with software release change requests, outcomes of historical software release change requests, and/or the like over a predetermined past period of time. In doing so, the system may be configured to generate inferences regarding software release change requests, issues encountered when implementing software release change requests, confidence scores for software release change requests, threshold limits for configuration items, and/or the like. In some embodiments, the one or more machine learning algorithms may be used to calculate likelihoods, and whether the likelihoods satisfy a threshold. Additionally, or alternatively, the system may continuously re-train the machine learning model using software release change request data and implementation outcomes of software release change requests analyzed and implemented by the system.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory) that may direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:

1. A system for evaluating, validating, and implementing software release change requests to a system environment based on artificial intelligence input, the system comprising:
    at least one non-transitory storage device; and
    at least one processing device coupled to the at least one non-transitory storage device, wherein the at least one processing device is configured to:
        receive a software release change request comprising a change to be made to a configuration item of a system environment;
        determine, based on a change inference database, potential failure points associated with deploying the software release change request in the system environment, wherein the change inference database is generated based on historical software release change request data;
        determine, based on the potential failure points, a confidence score for the change by deploying a cognitive release evaluation module;
        determine whether the confidence score for the change satisfies a threshold limit for the configuration item, wherein the threshold limit is a baseline value to approve changes to the configuration item;
        prevent the software release change request from being deployed in the system environment until the confidence score for the change satisfies the threshold limit for the configuration item by generating, based on determining that the confidence score for the change satisfies the threshold limit for the configuration item, based on the change, and based on a change window for the software release change request, a secure token for the software release change request, wherein the secure token is only valid during the change window;
        when preventing the software release change request from being deployed in the system environment, determine whether the secure token is valid;
        generate, based on determining that the confidence score for the change satisfies the threshold limit for the configuration item, an authentication token comprising instructions for deployment tools based on determining that the secure token is valid, based on a deployment tool database, and based on the secure token;
        implement, using the deployment tools and based on the instructions, the software release change request in the system environment; and
        conducting a post-implementation analysis, wherein the post-implementation analysis comprises analyzing one or more implementation defects, incidents, or problems associated with the change and applying the machine learning model or artificial intelligence module to refine one or more inferences or thresholds.

2. The system of claim 1, wherein the at least one processing device is configured to generate, based on the historical software release change request data, the change inference database.

3. The system of claim 2, wherein the at least one processing device is configured to, when generating the change inference database, generate the change inference database using a first machine learning model, wherein the first machine learning model is trained based on the historical software release change request data.

4. The system of claim 3, wherein the at least one processing device is configured to:
    when generating the change inference database, analyze the historical software release change request data using natural language processing; and
    when determining the potential failure points associated with deploying the software release change request in the system environment, analyze the software release change request using the natural language processing.

5. The system of claim 3, wherein the at least one processing device is configured to, after implementing the software release change request in the system environment:
    retrain the first machine learning model based on the historical software release change request data, the software release change request, and an outcome of implementing the software release change request in the system environment; and
    update the change inference database using the first machine learning model.

6. The system of claim 1, wherein the at least one processing device is configured to determine, based on the historical software release change request data, the threshold limit for each configuration item of the system environment.

7. The system of claim 6, wherein the at least one processing device is configured to, when determining the threshold limit for each configuration item of the system environment, determine the threshold limit for each configuration item of the system environment using a second machine learning model, wherein the second machine learning model is trained based on the historical software release change request data.

8. The system of claim 7, wherein the at least one processing device is configured to, after implementing the software release change request in the system environment:
retrain the second machine learning model based on the historical software release change request data, the software release change request, and an outcome of implementing the software release change request in the system environment; and
update the threshold limit for each configuration item of the system environment using the second machine learning model.

9. The system of claim 1, wherein the software release change request comprises multiple changes to be made to the configuration item and other changes to be made to other configuration items of the system environment, and wherein the at least one processing device is configured to:
when determining the confidence score, determine, based on the potential failure points, confidence scores for the multiple changes and other confidence scores for the other changes; and
when determining whether the confidence score for the change satisfies the threshold limit for the configuration item:
determine whether the confidence scores for the multiple changes satisfy the threshold limit for the configuration item; and
determine whether the other confidence scores for the other changes satisfy other threshold limits for the other configuration items.

10. The system of claim 1, wherein the at least one processing device is configured to:
determine, based on the historical software release change request data, classifications for historical software release change requests, wherein the classifications comprise configuration items of the system environment; and
determine, based on the software release change request, the classifications impacted by the software release change request.

11. The system of claim 1, wherein the confidence score is a probability of successful implementation of the software release change request in the system environment without negatively impacting other configuration items in the system environment.

12. A computer program product for evaluating, validating, and implementing software release change requests to a system environment based on artificial intelligence input, the computer program product comprising a non-transitory computer-readable medium comprising code causing a first apparatus to:
receive a software release change request comprising a change to be made to a configuration item of a system environment;
determine, based on a change inference database, potential failure points associated with deploying the software release change request in the system environment, wherein the change inference database is generated based on historical software release change request data;
determine, based on the potential failure points, a confidence score for the change by deploying a cognitive release evaluation module;
determine whether the confidence score for the change satisfies a threshold limit for the configuration item, wherein the threshold limit is a baseline value to approve changes to the configuration item;
prevent the software release change request from being deployed in the system environment until the confidence score for the change satisfies the threshold limit for the configuration item by generating, based on determining that the confidence score for the change satisfies the threshold limit for the configuration item, based on the change, and based on a change window for the software release change request, a secure token for the software release change request, wherein the secure token is only valid during the change window;
when preventing the software release change request from being deployed in the system environment, determine whether the secure token is valid;
generate, based on determining that the confidence score for the change satisfies the threshold limit for the configuration item, an authentication token comprising instructions for deployment tools based on determining that the secure token is valid, based on a deployment tool database, and based on the secure token;
implement, using the deployment tools and based on the instructions, the software release change request in the system environment; and
conduct a post-implementation analysis, wherein the post-implementation analysis comprises analyzing one or more implementation defects, incidents, or problems associated with the change and applying the machine learning model or artificial intelligence module to refine one or more inferences or thresholds.

13. The computer program product of claim 12, wherein the non-transitory computer-readable medium comprises code causing the first apparatus to generate, based on the historical software release change request data, the change inference database.

14. The computer program product of claim 13, wherein the non-transitory computer-readable medium comprises code causing the first apparatus to, when generating the change inference database, generate the change inference database using a first machine learning model, wherein the first machine learning model is trained based on the historical software release change request data.

15. The computer program product of claim 14, wherein the non-transitory computer-readable medium comprises code causing the first apparatus to:
when generating the change inference database, analyze the historical software release change request data using natural language processing; and
when determining the potential failure points associated with deploying the software release change request in the system environment, analyze the software release change request using the natural language processing.

16. The computer program product of claim 14, wherein the non-transitory computer-readable medium comprises code causing the first apparatus to, after implementing the software release change request in the system environment:
retrain the first machine learning model based on the historical software release change request data, the software release change request, and an outcome of implementing the software release change request in the system environment; and update the change inference database using the first machine learning model.

17. A method for evaluating, validating, and implementing software release change requests to a system environment based on artificial intelligence input, the method comprising:
  receiving a software release change request comprising a change to be made to a configuration item of a system environment;
  determining, based on a change inference database, potential failure points associated with deploying the software release change request in the system environment, wherein the change inference database is generated based on historical software release change request data;
  determining, based on the potential failure points, a confidence score for the change by deploying a cognitive release evaluation module;
  determining whether the confidence score for the change satisfies a threshold limit for the configuration item, wherein the threshold limit is a baseline value to approve changes to the configuration item;
  preventing the software release change request from being deployed in the system environment until the confidence score for the change satisfies the threshold limit for the configuration item by generating, based on determining that the confidence score for the change satisfies the threshold limit for the configuration item, based on the change, and based on a change window for the software release change request, a secure token for the software release change request, wherein the secure token is only valid during the change window;
  when preventing the software release change request from being deployed in the system environment, determine whether the secure token is valid;
  generating, based on determining that the confidence score for the change satisfies the threshold limit for the configuration item, an authentication token comprising instructions for deployment tools based on determining that the secure token is valid, based on a deployment tool database, and based on the secure token;
  implementing, using the deployment tools and based on the instructions, the software release change request in the system environment; and
  conducting a post-implementation analysis, wherein the post-implementation analysis comprises analyzing one or more implementation defects, incidents, or problems associated with the change and applying the machine learning model or artificial intelligence module to refine one or more inferences or thresholds.

* * * * *